United States Patent
Martin et al.

(10) Patent No.: US 11,624,417 B2
(45) Date of Patent: Apr. 11, 2023

(54) BRAKING BAND OF A DISK FOR A DISK BRAKE OF THE VENTILATED TYPE

(71) Applicant: Brembo North America, Inc., Plymouth, MI (US)

(72) Inventors: Colin Martin, Plymouth, MI (US); Christopher Stoick, Plymouth, MI (US); Sheldon Wylie, Plymouth, MI (US); Kevin Thompson, Plymouth, MI (US); Mark Olson, Plymouth, MI (US); Fabiano Carminati, Curno (IT)

(73) Assignee: Brembo North America, Inc., Plymouth, MI (US)

( * ) Notice: Subject to any disclaimer, the term of this patent is extended or adjusted under 35 U.S.C. 154(b) by 141 days.

(21) Appl. No.: 17/174,653

(22) Filed: Feb. 12, 2021

(65) Prior Publication Data
US 2022/0260123 A1    Aug. 18, 2022

(51) Int. Cl.
*F16D 65/12* (2006.01)
*F16D 65/02* (2006.01)

(52) U.S. Cl.
CPC ......... *F16D 65/128* (2013.01); *F16D 65/123* (2013.01); *F16D 2065/1328* (2013.01); *F16D 2065/1384* (2013.01)

(58) Field of Classification Search
CPC ... F16D 65/123–128; F16D 2065/1328; F16D 2065/1384
(Continued)

(56) References Cited

U.S. PATENT DOCUMENTS

| 4,865,167 A | 9/1989 | Giorgetti et al. |
| 5,542,503 A | 8/1996 | Dunn et al. |

(Continued)

FOREIGN PATENT DOCUMENTS

| EP | 1373751 B1 | 2/2007 |
| EP | 1907722 B1 | 10/2008 |

(Continued)

OTHER PUBLICATIONS

European Patent Office, International Search Report and Written Opinion in application No. PCT/US2022/016049, dated May 12, 2022, 16 pages. Rijswick, Netherlands.

*Primary Examiner* — Christopher P Schwartz
(74) *Attorney, Agent, or Firm* — Marshall & Melhorn, LLC

(57) ABSTRACT

A braking band of a disk brake disk has a first plate and a second plate arranged joined to each other by connecting elements. The first and second plates have first and second plate outer surfaces, opposite portions of the first and second outer surfaces forming opposite braking surfaces. The braking band has a plurality of attachment portions for connecting the braking band to a vehicle hub or a bell. Each attachment portion has a connection seat. The attachment portions are spaced by recesses. Each attachment portion has an attachment portion wall having opposite side wall portions, two bottom wall portions and an inner end wall portion, and opposite first and second attachment portion surfaces. Each recess extends radially beyond the connection seat. Each side wall portion is joined to the adjoining bottom wall portion by a cylindrical bottom arch avoiding edges. Each side wall portion is joined to the adjoining inner end wall portion by a cylindrical end arch avoiding edges. Each first attachment portion surface is coplanar to the first (Continued)

braking surface except for the wear of the first braking surface.

18 Claims, 9 Drawing Sheets

(58) Field of Classification Search
USPC .................. 188/218 XL, 264 A, 264 AA
See application file for complete search history.

(56) References Cited

U.S. PATENT DOCUMENTS

| | | | |
|---|---|---|---|
| 6,367,599 B2 | 4/2002 | Kobayashi | |
| 6,962,242 B2* | 11/2005 | Conti | F16D 65/123 |
| | | | 188/71.6 |
| 7,066,306 B2 | 6/2006 | Gavin | |
| 7,267,210 B2 | 9/2007 | Cornolti et al. | |
| 10,024,377 B2* | 7/2018 | Maronati | F16D 65/128 |
| 10,690,203 B2* | 6/2020 | Wiseman | B22D 25/02 |
| 2004/0124047 A1 | 7/2004 | Oberti et al. | |
| 2006/0243546 A1 | 11/2006 | Oberti et al. | |
| 2012/0255821 A1 | 10/2012 | Cavagna et al. | |
| 2020/0191213 A1* | 6/2020 | Matti | F16D 65/123 |

FOREIGN PATENT DOCUMENTS

| | | |
|---|---|---|
| WO | 02064992 A2 | 8/2002 |
| WO | 2004102028 A1 | 11/2004 |
| WO | 2019082028 A1 | 5/2019 |

\* cited by examiner

BRAKING BAND OF A DISK FOR A DISK BRAKE OF THE VENTILATED TYPE

FIELD OF THE INVENTION

The present invention relates to a braking band and a ventilated disk for a disk brake, particularly, but not exclusively, for applications in the automotive and/or industrial field, as well as to a vehicle having said ventilated disk.

The present invention further relates to a disk brake disk comprising a braking band and a vehicle hub or a bell associated with the braking band and adapted to connect to a wheel hub of a vehicle.

The present invention further relates to a vehicle comprising a disk for a disk brake.

BACKGROUND OF THE INVENTION

In a disk brake, the brake caliper is generally arranged straddling the outer peripheral margin of a brake disk, which is adapted to rotate about a rotation axis (A-A) defining an axial direction (X-X). In a disk brake, a radial direction (R-R), orthogonal to the axial direction (X-X), a circumferential direction (C-C), orthogonal both to the axial direction (X-X) and to the radial direction (R-R), and a tangential direction (T-T) locally or punctually, i.e. in an intersection point of the axial and radial directions, orthogonal to both the axial direction (X-X) and the radial direction (R-R) are further defined.

As is known, a disk for a disk brake comprises a bell adapted to associate the disk with a vehicle hub, from which an annular portion, called braking band extends, which is intended to cooperate with brake pads of a caliper. In the case of ventilated type disks, the braking band is made by two plates, mutually facing and connected to each other, respectively, by connection elements in the form of pillars or fins. The outer surfaces of the two plates define opposite braking surfaces, while the inner surfaces, together with the pillars or fins, delimit ventilation channels for cooling the disk, the ventilation channels being crossed by airflows according to a centrifugal direction during rotary motion of the disk.

The braking band is intended to cooperate with disk brake calipers, which are adapted to apply a braking action on the vehicle by applying, by the aforesaid pads, friction on opposite surfaces of the two plates, referred to as braking surfaces.

It is known that during operation of the brakes, friction between the pads of the brake calipers and the braking surfaces of the braking band generates a high amount of heat, which requires disposal.

Indeed, the generated heat causes several undesired phenomena, such as, deformation of the braking band, formation of cracks on the connection portions between the braking band and the bell and on the braking surfaces or localized transformations of the state of the material forming the braking band, which, in turn, result in the deterioration of the braking band.

In particular, in applications on high-performance motor vehicles or on industrial vehicles with high braking efficiency, there is considerable energy to be disposed of, and the need to dispose of the heat generated during the braking action is even more greatly felt.

Ventilated disks of the type mentioned above have undergone a continuous evolution over time, in particular concerning the number and shape of the ventilation channels, thus defining the gap formed by the two plates axially facing each other.

Among known ventilated disks, "pillar" disks have shown to be particularly efficient in terms of performance of heat disposal, i.e. cooling. In "pillar" disks, the ventilation channels are limited internally by particular column connecting elements, having a limited, or substantially poorly different radial and circumferential extension with respect to the axial extension thereof, definable as "pillars", which transversely connect the two plates.

Ventilated "pillar" disks are known from EP 1 373 751 B1, in which the pillars are geometrically arranged along three concentric circumferences, which are coaxial to the disk and of a different radius, forming three "ranks". If cross-sectioned on a plane parallel to the two plates and median with respect thereto, the pillars have different types of cross-sections (e.g. "rhomboidal" cross-section pillars in the intermediate and inner lines; "drop-shaped" pillars in the outer line).

Other ventilated disks with "pillar" structures are known, for example, from WO 2004/102028 and U.S. Pat. No. 5,542,503.

So-called "fin" or "wing" disks are known among ventilated disks, in which ventilation channels are limited internally by particular connecting elements, which are elongated along a main direction, e.g. according to a direction parallel to the radial direction (R-R), or spiral-like, which transversely connect the two plates.

It is also known that the braking action provided by the pads against the braking surfaces of the disk generates heat, and an increase in temperature of the disk to the extent of making the disk incandescent in the case of particularly demanding performance. Due to the high temperature reached by the disk during braking, the disk is deformed and contact between the pads and the braking surfaces deteriorates. Furthermore, the friction material of the pads undergoes a kind of vitrification and pollution by the disk material.

Furthermore, it has been found that the highest temperature is reached at a middle annular portion of the braking surfaces, i.e. at a middle annular portion of the outer surfaces of the respective plates. Such a zone is easily subject to formation of cracks over the course of the life of the disk.

To obviate the above-disclosed drawbacks, the need is, on the one hand, to increase the dispersion efficiency of the heat generated by the braking to contain the temperatures reached by the disk during and after braking, and, on the other hand, to increase mechanical resistance of the middle portions of the braking band.

Solutions are disclosed in WO 2004/102028, WO 2002/064992, U.S. Pat. Nos. 7,066,306, 7,267,210, US 2006 0243546, US 2004 0124047, U.S. Pat. Nos. 6,367,599, 5,542,503 and 4,865,167. Although satisfactory from various points of view, these solutions do not allow a compromise to be reached between the desired mechanical resistance in the middle annular zone of the braking band and the contrasting need to maximize, in the same zone, the air flow, capable of removing the significant increase in localized temperature, caused by the braking action.

However, it is worth noting that ventilated disks of the type mentioned above do not provide a solution to a further problem, briefly described hereinbelow, which may impact disk brakes, in particular, disk brakes with ventilated disks, arising simultaneously with the problem mentioned above and which is to be resolved at the same time.

As is known, high thermal gradients occur in commercial vehicles during long resistance cycles, such as, prolonged braking of commercial vehicles on a mountain descent. Detailed analyses of brake disks have shown the presence of uneven temperature distribution and variation over time.

In particular, current models of brake disks for commercial vehicles are susceptible to breaking in the connection portions between the braking band and the bell, and, in particular, at the attachment holes, as well as at the coupling surface for coupling to the bell. Breakages or cracks may appear early on, especially when they are subjected to long resistance cycles at low deceleration, typical of mountain descents. These breakages or cracks or splits are a direct consequence of improper thermal distribution, which results in excessive thermal stress on the inner diameter of the braking band.

The main cause of breakages is radial expansion of the breaking band, which is subjected to prolonged heating caused by friction between the braking band and the brake pads. Since the zone of the braking band, which is joined to the bell, heats less than the braking band portion where the braking surfaces are present, localized high temperature gradients are formed, resulting in formation of cracks in the zones adjoining the connection holes, as illustrated in FIG. 8, showing a side view of a braking band portion of the state of the art, where different shades of gray show the thermal gradient. As shown by the divergent arrows beneath the connection hole, the thermal gradient results in deformations of the braking band, which tend to pull the portion beneath the connection hole, sometimes to the point of generating a breakage.

In order to avoid the above drawback, it was attempted to radially insert open eyelets between the connection portions of the braking band, as shown in FIG. 9. This allowed the thermal gradient to be lowered in this region of the braking band; however, as expected, it increased stress at the base of the open eyelets where breakages appeared, in particular, breakages also affecting the braking surfaces.

Therefore, a need is felt to reach a compromise between the efficiency of ventilation both in the ventilation channel created with the gap between the two facing plates and in the attachment portion for attaching the braking band to the bell, and to prevent the thermal gradients caused by improved ventilation from excessively stressing the connection portions for connecting the braking band to the bell to the point of creating breakages.

It was attempted to solve such need by increasing the thicknesses of the connection portions for connecting the braking band to the bell and creating geometrical decouplings between the connection portions and the braking surfaces, such as channels or grooves.

However, increase in thermal mass and geometrical complexity has not brought acceptable results.

Therefore, the problem underlying the present invention is to provide a braking band and a disk for a disk brake, which have structural and functional features to satisfy the aforementioned requirements and, at the same time, solve the drawbacks mentioned with reference to the prior art.

SUMMARY OF THE INVENTION

It is the object of the present invention to provide a braking device in which tendency to create considerable thermal gradients and localized stress peaks is reduced.

This and other objects and advantages are achieved by a braking band, a disk brake disk and a vehicle as described and claimed herein.

Advantageous embodiments are also described.

The present disclosure facilitates thermal transfer and thermal expansion of the inner diameters and the attachment portion for attaching the braking band to the bell.

Furthermore, the present disclosure prevents excessive transfer of heat to the inner part of the braking band, avoiding creation of high thermal traction stress with consequent cracks in the attachment portion and the plates.

Mountain descent simulation tests showed significant improvements both in thermal gradient and stress localized in the surface of the attachment portion for attaching the braking band to the bell and, at the same time, a reduction in the cracks in the braking surfaces.

The solution of the present invention, which was tested on 250 resistance cycles, showed no cracks and improved heat distribution, unlike the solutions of prior art, which show cracks after fewer than 75 cycles.

The solution of the present invention allows thermal gradients to be reduced inside the braking band and thermal conductivity to be managed inside the braking band. These project modifications create a uniform thermal expansion profile, with a consequent reduction in traction stress in the mounting surface and in the braking surfaces. These modifications eliminate breakages on the surface of the attachment portions and increase the number of cycles needed for cracks to appear on the braking surfaces.

By virtue of the solution of the present invention it is also possible to obtain superior braking comfort with respect to the solutions of the prior art and, therefore, a reduction in the vibrations due to thermal deformations.

Moreover, the solution of the present invention maintains a high and improved disk cooling efficiency. For example, efficiency is significantly improved due to the increased air flow turbulence through the gap of the braking band, which is determined by the specific shape of the heat dissipation and connecting elements present between the plates.

Furthermore, by virtue of the suggested solutions, it is possible to ensure an increase in the thermal breakage resistance.

Further features and advantages of the braking band, of the disk brake disk and of the vehicle of the present invention will be apparent from the following description of preferred embodiments thereof, given by way of non-limiting examples, with reference to the accompanying figures

DETAILED DESCRIPTION

Figure 1:
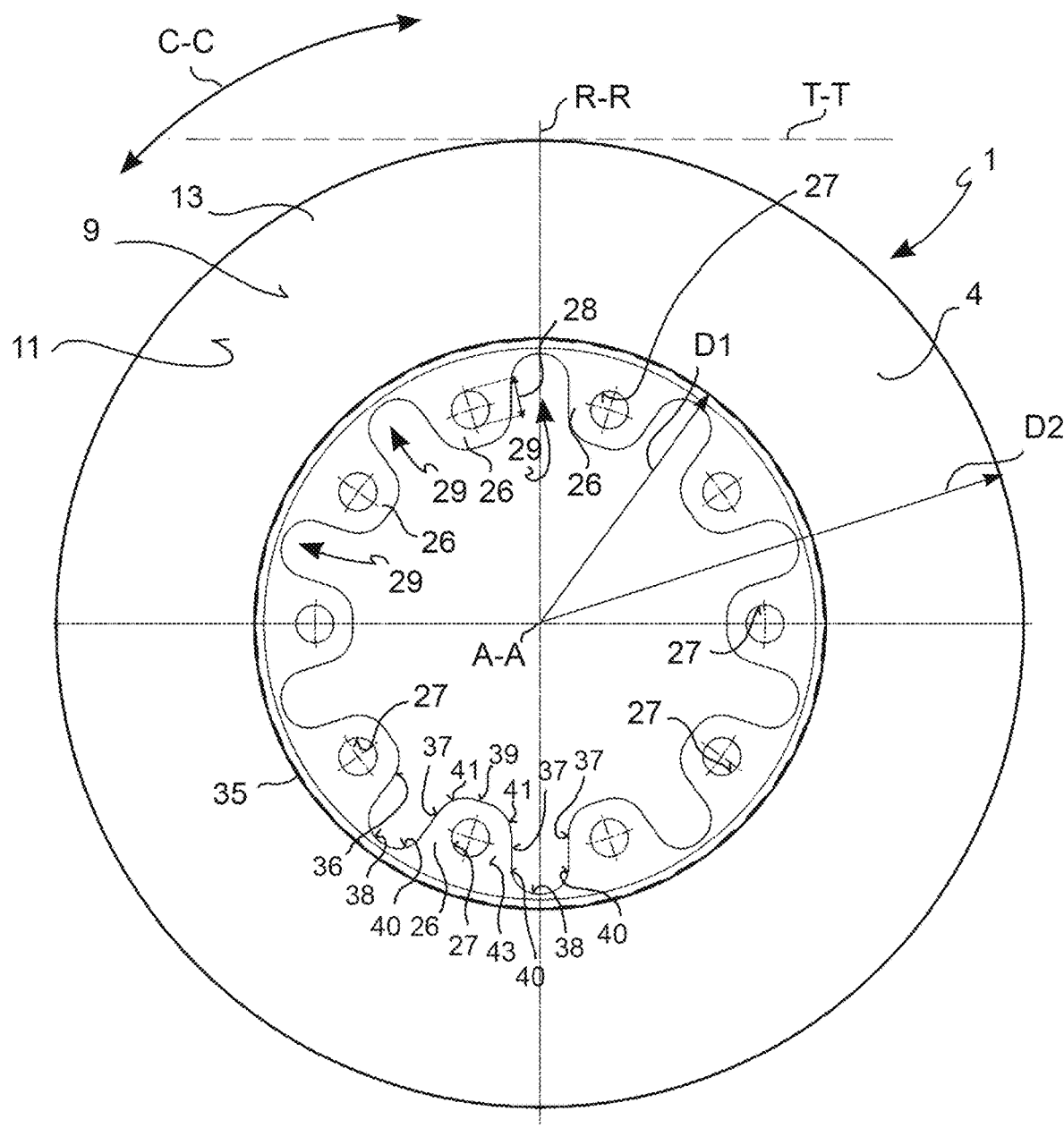
FIG. 1 shows an inner side or vehicle side front view of a braking band according to the present invention.
Figure 2:
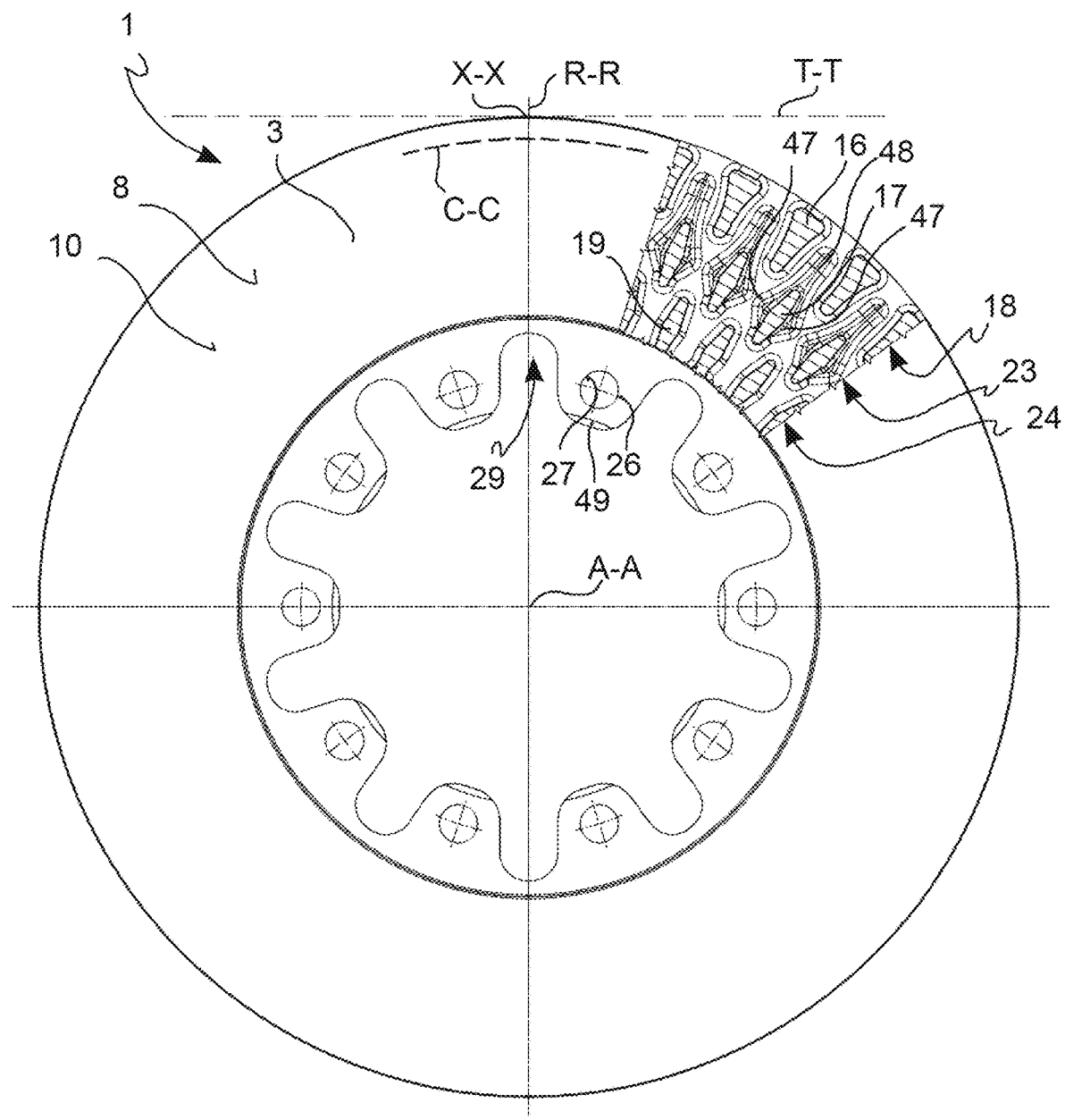
FIG. 2 shows an outer side or wheel side front view of the braking band of FIG. 1, in which an angular sector has been sectioned to show the gap and the dissipation and connecting elements sectioned at a median plane of the flow of cooling fluid crossing the gap.
Figure 3:
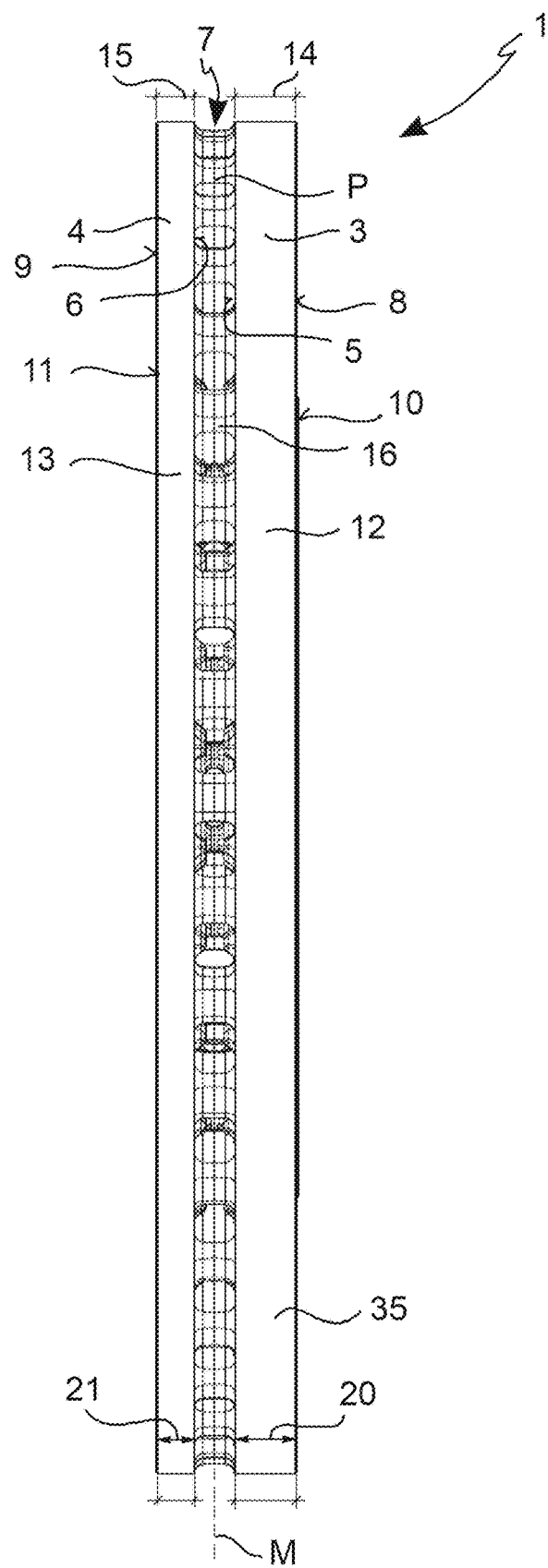
FIG. 3 shows a side view of the braking band of FIG. 1.

According to a general embodiment, a braking band 1 of a disk for a disk brake 2 of the ventilated type is provided.

The braking band 1 extends about a rotation axis A-A of the braking band 1. The rotation axis defines an axial direction X-X.

The braking band 1 defines a radial direction R-R, substantially orthogonal to the axial direction X-X, a circumferential direction C-C, orthogonal both to the axial direction X-X and to the radial direction R-R, and a tangential direction T-T, punctually orthogonal to the axial direction X-X and the radial direction R-R.

The braking band 1 comprises two plates 3, 4, a first plate 3 and a second plate 4 arranged mutually facing each other.

The first and second plates 3, 4 comprise, respectively, a first plate inner surface 5 and a second plate inner surface 6 arranged directly or indirectly facing and delimiting a gap 7.

The first and second plates 3, 4 are joined to each other by heat dissipation and connecting elements 16, 17, 19, also referred to as connection elements.

The connection elements 16, 17, 19 project from a plate 3 or 4 to reach the opposite plate 4 or 3, forming bridges, connecting the plates 3, 4 to each other.

The first and second plates 3, 4 comprise first and second plate outer surfaces 8, 9, wherein opposite portions of the first and second plate outer surfaces 8, 9 form opposite braking surfaces 10, 11, a first plate braking surface 10 and a second plate braking surface 11, the first and second plate braking surfaces 10, 11 being adapted to cooperate with brake pads 25 to apply a braking action on a vehicle.

The first and second plate braking surfaces 10, 11 extend between an inner diameter D1, near the rotation axis X-X of the braking band 1, and an outer diameter D2, far from the rotation axis X-X.

The braking band 1 further comprises a plurality of attachment portions 26 for connecting the braking band 1, directly or indirectly, for example, but not necessarily through a bell 33, to a vehicle hub 50.

Each attachment portion 26 of said plurality of attachment portions 26 extends radially towards the rotation axis A-A of the braking band.

Each attachment portion 26 comprises at least one connection seat 27 for directly connecting the braking band 1 to the bell 33; the connection seat having a predefined arrangement in the radial direction R-R and a predefined radial connection seat height 28.

The plurality of attachment portions 26 are spaced apart by recesses 29 forming free openings in axial direction X-X and in radial direction R-R.

Each attachment portion 26 comprises an attachment portion wall 36 extending in axial X-X direction and radial R-R direction. The attachment portion wall 36 comprises opposite side wall portions 37, each side wall portion 37 facing an adjoining attachment portion 26, two bottom wall portions 38 in common with adjoining attachment portions 26, each bottom wall portion facing the rotation axis A-A and connecting two adjoining attachment portions 26, and an inner end wall portion 39 placed at a radially inner end of each attachment portion 26 and connecting the opposite side wall portions 37.

Each attachment portion 26 comprises opposite first and second attachment portion surfaces 42, 43 extending in circumferential direction C-C and radial direction R-R. One of the attachment portion surfaces 42 externally faces the braking band 1, this surface, is defined first attachment portion surface 42.

Advantageously, each recess 29 extends radially R-R beyond the connection seat 27 coming close to the inner diameter D1 of the first and second plate braking surfaces 10, 11.

Each side wall portion 37 is joined to the adjoining bottom wall portion 38 by a cylindrical bottom arch 40 avoiding edges. According to an embodiment, the radius of the cylindrical bottom arch 40 is configured to maximize uniformity of thermal distribution on the attachment portions 26, for example, a mounting flange, with respect to the number of attachment points, i.e. attachment portions 26. The attachment flanges must have a sufficient thickness to withstand torsion loads of the application. The depth of the recesses 29 can extend close to the braking surface, i.e. just enough to avoid interfering with the correct interfacing of the pads 25 on the first plate braking surface 10. According to an embodiment, the thickness of the mounting flange is designed to maximize uniformity of thermal distribution on the mounting flange while preserving the capacity to withstand torsional loads of the application. The attachment flanges must have a sufficient section thickness to withstand torsion loads of the application.

Each side wall portion 37 is joined to the adjoining inner end wall portion 39 by a cylindrical end arch 41 avoiding edges.

Each first attachment portion surface 42 is substantially coplanar to said first plate braking surface 10 except for wear of the first plate braking surface 10.

The term "substantially coplanar" means that the braking band is new, i.e. without wear, or with minimum wear, i.e. similar to wear resulting from the running-in of a vehicle. Each first attachment portion surface 42 is coplanar to the first plate braking surface 10 with a difference comprised between +1 mm and −1 mm in axial direction X-X. In other words, there may be a maximum difference in height of 1 mm both in positive and negative, in an axial direction between each first attachment portion surface 42 and the first plate braking surface 10. Nonetheless, between each first attachment portion surface 42 and the first plate braking surface 10 a gap, a channel or a fitting of another type may be formed.

According to an alternative embodiment, each of the first and second plate braking surfaces 10, 11 is arranged on a braking surface plane. Each braking surface plane is arranged to comprise a radial direction R-R and a circumferential direction C-C.

According to an alternative embodiment, the first plate braking surface 10 is an outer braking surface 10 or a braking surface facing the wheel of the vehicle.

According to an alternative embodiment, the second plate braking surface 11 is an inner braking surface 11 or a braking surface facing the vehicle.

According to an alternative embodiment, each first attachment portion surface 42 is coplanar to the first plate braking surface 10 new or in its average state of wear.

According to an alternative embodiment, the second attachment portion surface 43 is coplanar to the first inner surface 5 of the first plate 3 delimiting the gap 7.

According to an alternative embodiment, the first attachment portion surface 42 is joined to the first plate braking surface 10 avoiding channels or grooves.

According to an alternative embodiment, the second attachment portion surface 43 is joined to the first inner surface 5 of the first plate 3 avoiding channels or grooves.

According to an alternative embodiment, the plurality of attachment portions 26 for attaching the braking band 1 to vehicle hub 50 or a bell 33 are uniformly distributed along the circumferential direction C-C.

According to an alternative embodiment, the side wall portions 37 of adjoining attachment portions 26 are mutually facing and parallel.

According to an alternative embodiment, the plurality of attachment portions 26 of the braking band 1 forms a lobed geometry devoid of edges.

According to an alternative embodiment, all attachment portion walls 36 of the plurality of attachment portions 26 comprise cylindrical bottom arches 40 of equal dimensions.

According to an alternative embodiment, all attachment portion walls 36 of the plurality of attachment portions 26 comprise cylindrical end arches 41 of equal dimensions.

According to an alternative embodiment, the cylindrical end arches 41 have greater dimensions than the cylindrical bottom arches 40.

According to an alternative embodiment, dimension of the cylindrical end arches 41 is 14 mm and dimension of the cylindrical bottom arches 40 is 12 mm.

According to an alternative embodiment, each attachment portion 26 of the plurality of attachment portions 26 of the braking band 1 comprises a predefined attachment portion axial thickness 44 evaluated in axial direction X-X. The attachment portion axial thickness 44 is substantially equal to the axial thickness 14 of the first plate.

According to an alternative embodiment, each attachment portion 26 of said plurality of attachment portions 26 of the braking band 1 comprises a predefined attachment portion axial thickness 44 evaluated in axial direction X-X, the attachment portion axial thickness 44 being of 18 mm.

According to an alternative embodiment, projections different from the plurality of attachment portions 26 are avoided, e.g. phonic wheel connection projections are avoided in the braking band 1.

Figure 4:
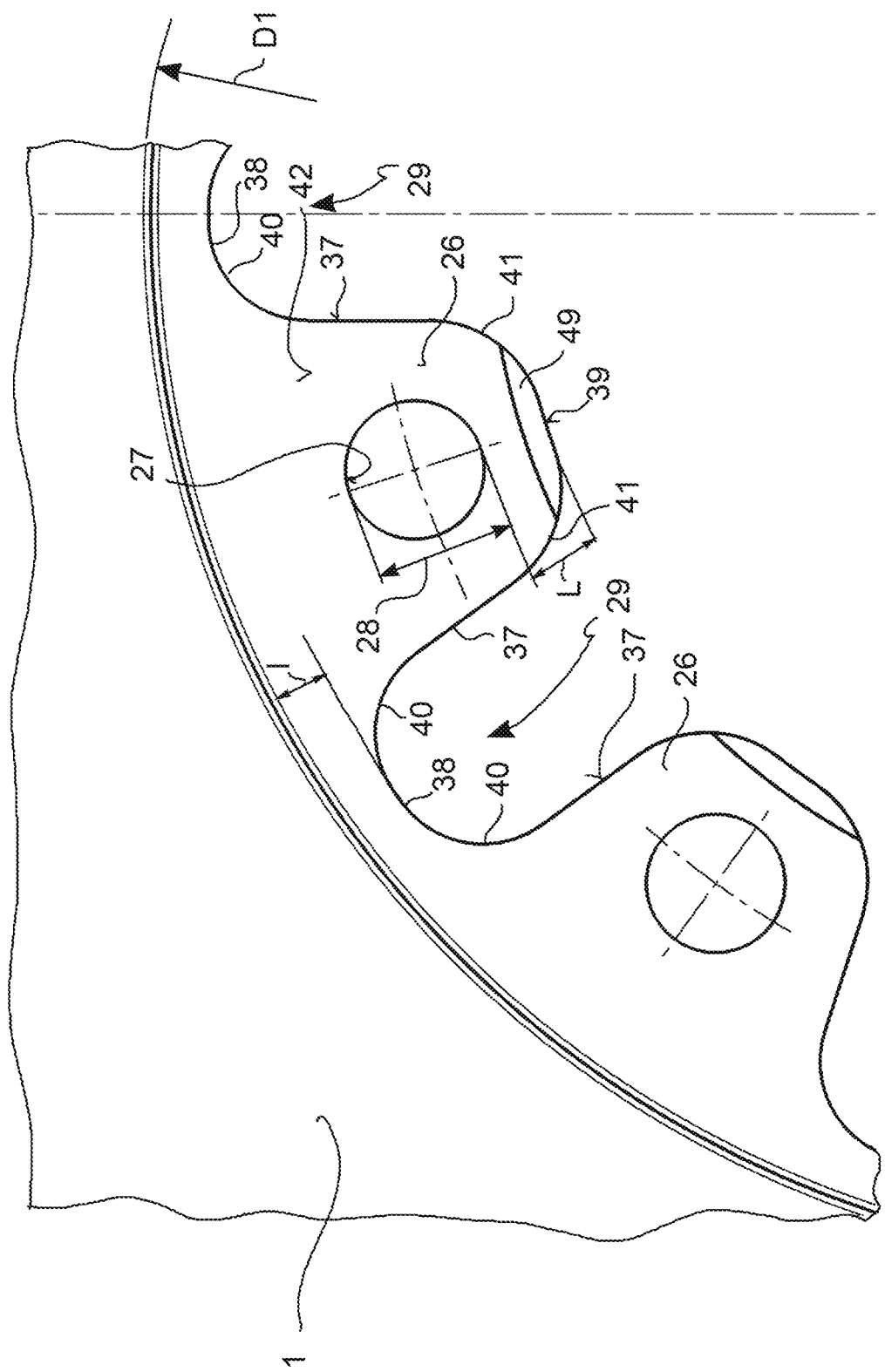
FIG. 4 shows an outer side or wheel side front view of a detail of the braking band of FIG. 1 and, in particular, of the attachment portions for connection of the braking band to a vehicle hub, for example, a hub with a bearing, or a bell.
Figure 5:
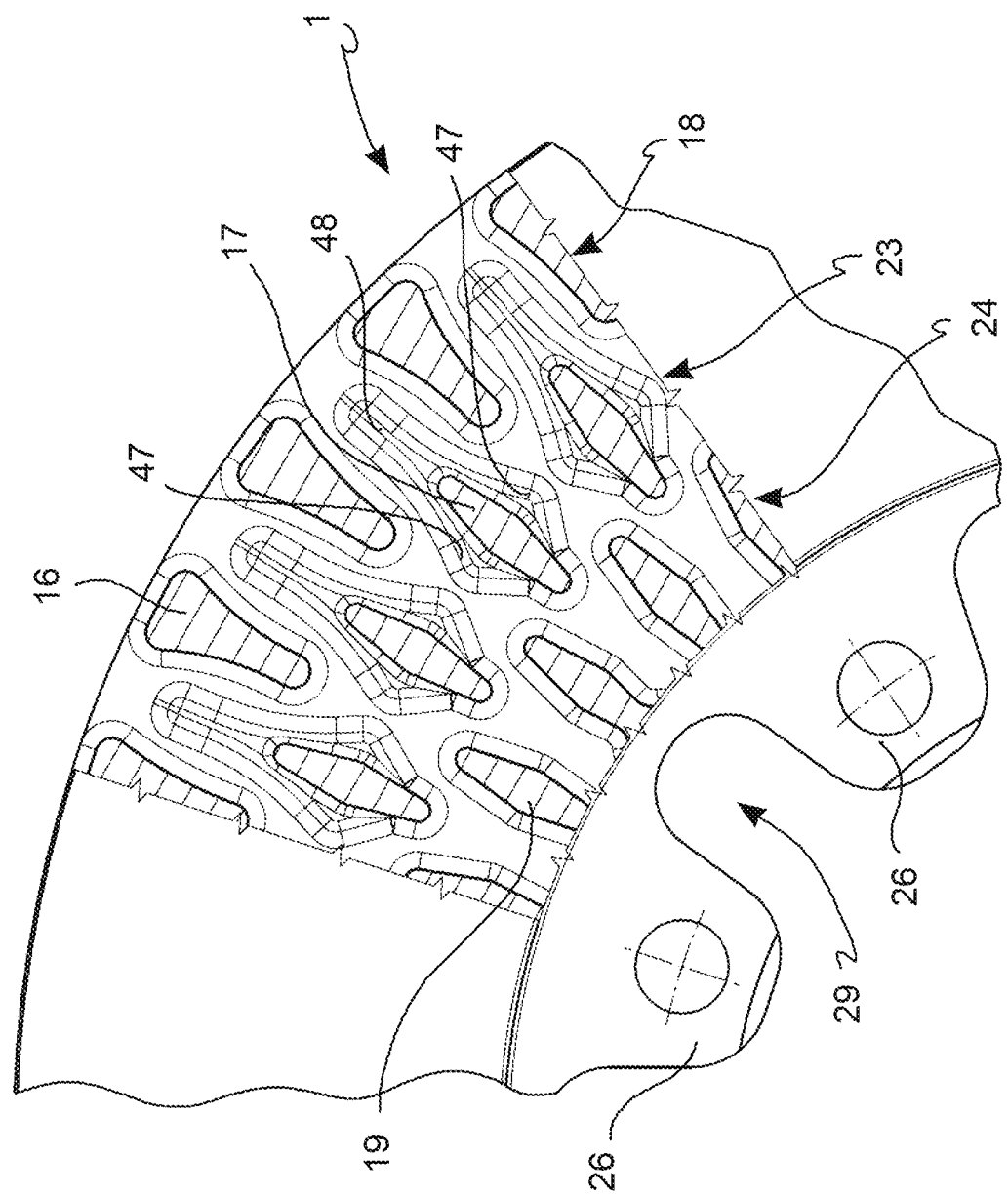
FIG. 5 is an outer side or wheel side front view of a further detail of the braking band of FIG. 1 and, in particular, of the attachment portions for connection of the braking band to a vehicle hub or a bell and a sectioned portion of an angular sector has been sectioned to show the gap and the dissipation and connecting elements sectioned at a median plane of the flow of cooling fluid crossing the gap.
Figure 6:
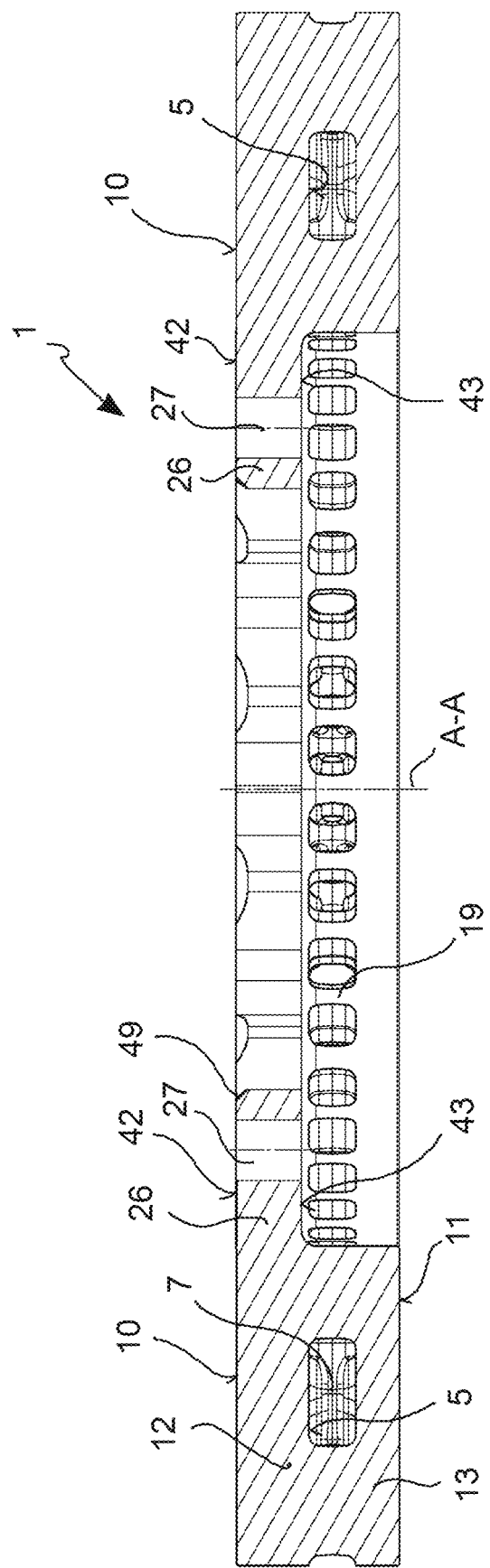
FIG. 6 shows a cross-section of the braking band of FIG. 1.
Figure 7:
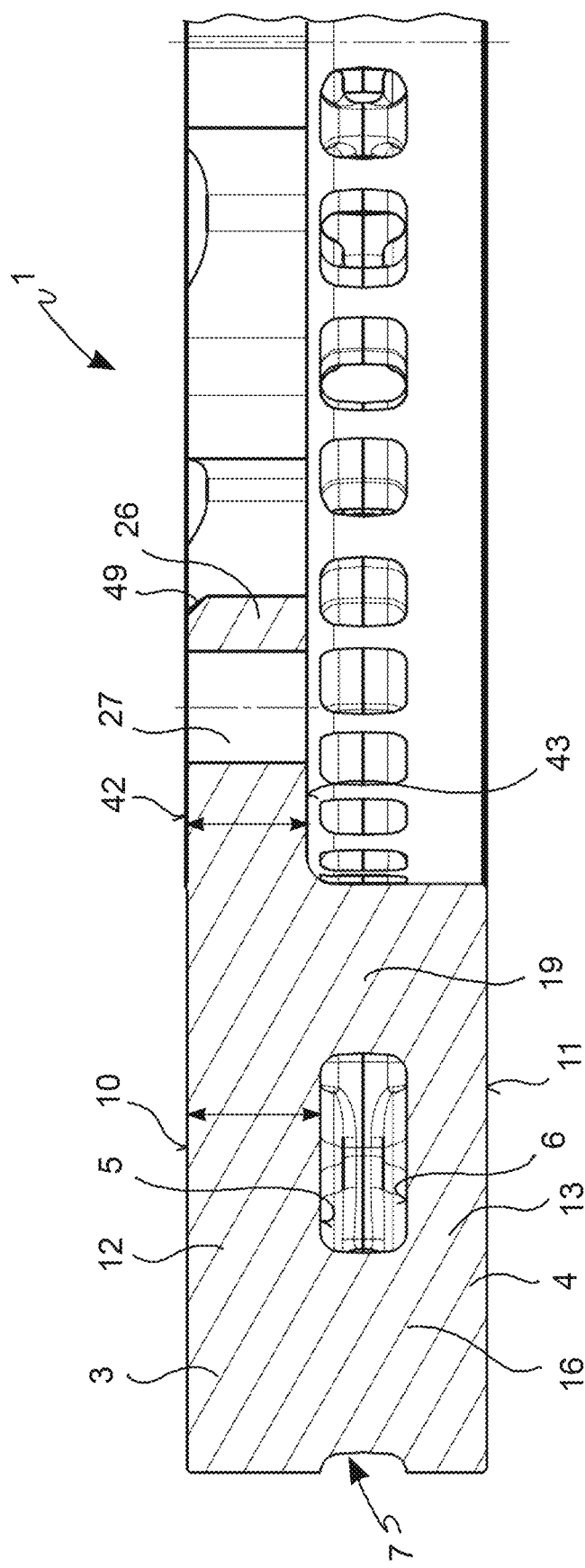
FIG. 7 is an enlargement of the section OF FIG. 6, in which the connection portions between the plates and the attachment portion are clearly visible.
Figure 8:
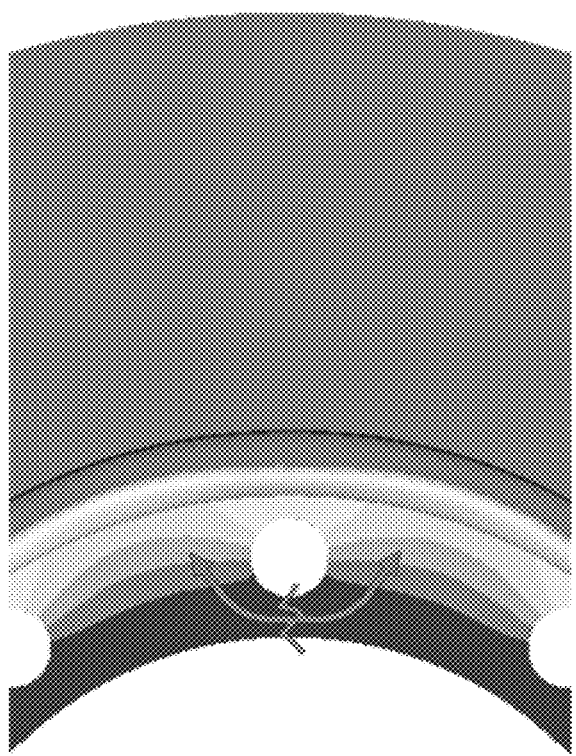
FIG. 8 is a detail of a braking band of the state of the art in which temperature values are shown in shades of gray when the band is subject to a braking test simulating a mountain descent and in which the arrows indicate mechanical stress caused by thermal gradients, which result in breakage of the attachment portion.
Figure 9:
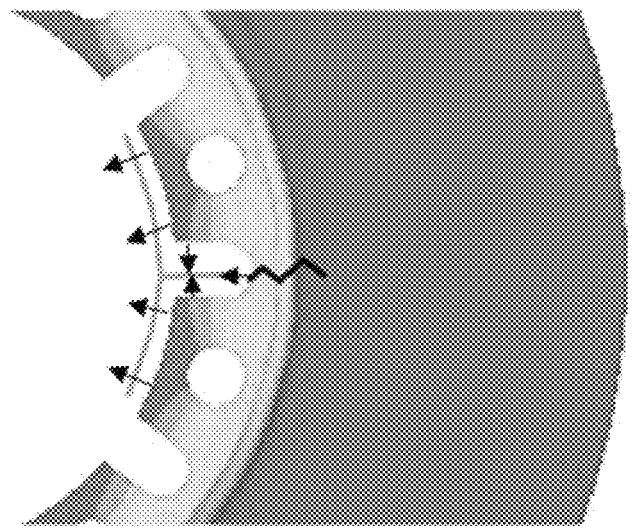
FIG. 9 is a detail of a braking band, introducing separation channels between the attachment portions, showing how this solution allows reducing thermal gradients, but not the localized stress they create, resulting in cracks at the base of the channels close to the plates, discouraging use of channels to uniform the cooling of the attachment portions.
Figure 10:
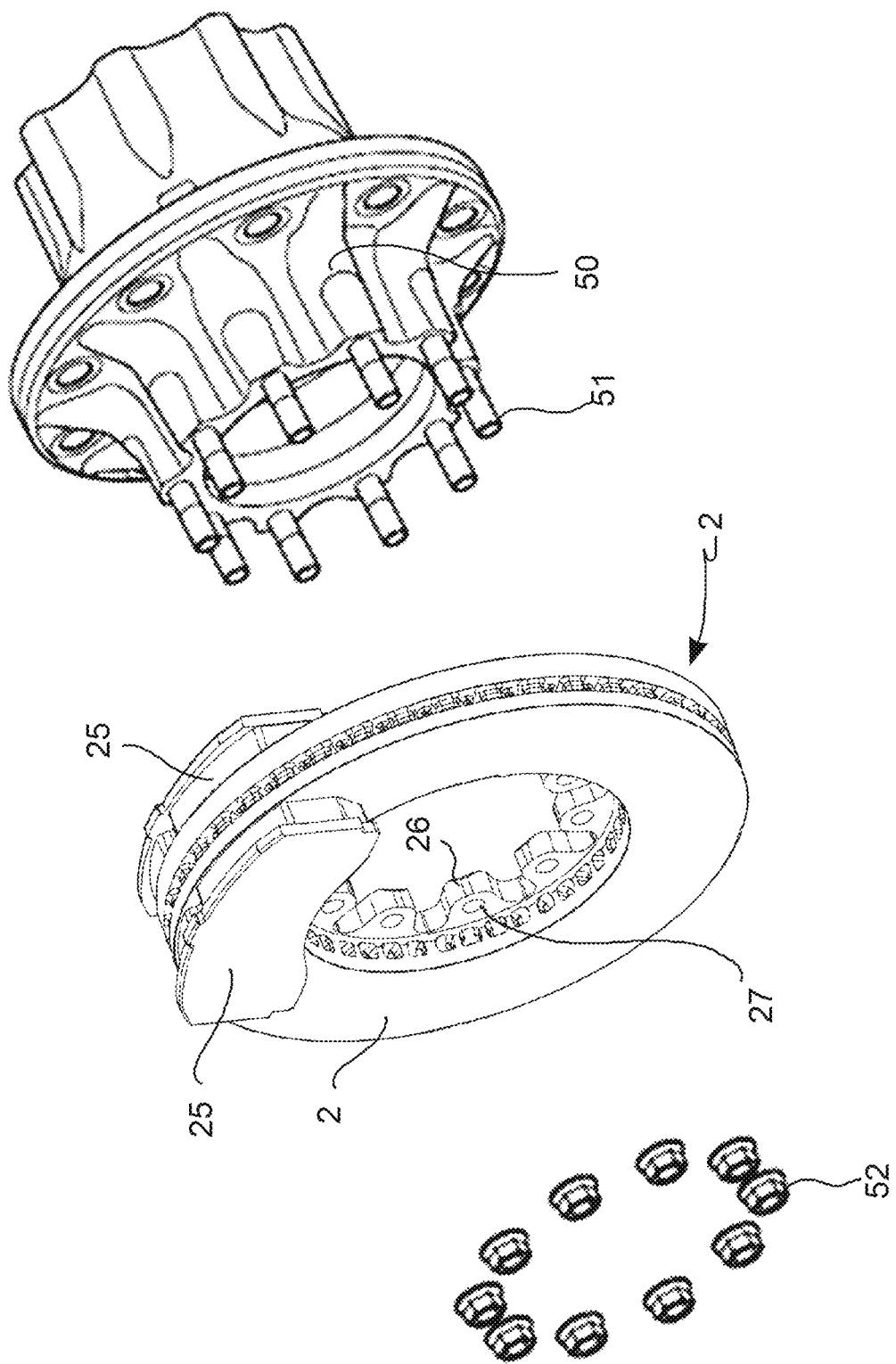
FIG. 10 shows an axonometric view with separated parts of a brake disk cooperating with a hub of a vehicle and with two brake pads, wherein the braking band is made according to the present invention.

According to an alternative embodiment, the connection seat 27 of each attachment portion 26 is an eyelet with a closed perimeter, where a closed path is understood to mean a path extending on a plane containing the radial R-R direction and the circumferential C-C direction. The connection seat 27 may be a hole, which is open in axial direction X-X. The distance, "L" in FIG. 4, between the inner end wall portion 39 and the closed perimeter of the connection seat 27 is greater than the distance, "I" in FIG. 4, between the bottom wall portion 38 and the first plate braking surface 10.

According to an alternative embodiment, in non-worn conditions, the first plate 3 has a predefined first plate axial thickness 20 defining the thickness in axial direction X-X of the first plate 3.

According to an alternative embodiment, in non-worn conditions, the second plate 4 has a predefined second plate axial thickness 21 defining the thickness in an axial direction X-X of the second plate 4.

According to an alternative embodiment, the first plate axial thickness 20 is greater than the second plate axial thickness 21.

According to an alternative embodiment, the first attachment portion surface 42 is joined to the inner end wall portion 39 by an attachment portion bevel 49, e.g. a wall inclined by 49 degrees with respect to the axial direction X-X.

According to an alternative embodiment, the first attachment portion surface 42 is joined to the inner end wall portion 39 by an attachment portion bevel 49 extending orthogonally to the radial direction R-R.

According to an alternative embodiment, the median plane of the flow of cooling fluid P crossing the gap 7 is displaced with respect to the center line M of the braking band.

According to an alternative embodiment, the median plane of the flow of cooling fluid crossing the gap 7 is displaced with respect to the center line M of the braking band by 0.75 mm.

According to an alternative embodiment, the median plane of the flow of cooling fluid P crossing the gap 7 is displaced along the axial direction X-X towards the second plate 4 with respect to the center line M of the braking band 1.

According to an alternative embodiment, each heat dissipation and connecting element 16, 17, 19 has two respective first and second connecting element ends 45, 46 at which the heat dissipation and connecting element is joined to the plates. Some of the heat dissipation and connecting elements 17 are associated with elongated ridges 47, 48 extending from at least one of the first and second connecting element ends 45, 46 in at least one given direction.

The elongated ridges 47, 48 are integrally formed with said heat dissipation and connecting elements 17 and at least one plate 3 or 4.

The elongated ridges 47, 48 are raised from at least one inner surface between the first and second inner surfaces 5, 6 of the first and second plates 3, 4, and emerge from at least one of the first and second inner surfaces 5 or 6 by a height, which is inferior to the axial distance between the first and second inner surfaces 5, 6 or to the gap height 7.

According to an alternative embodiment, the elongated ridges 47 are elongated ridges extending according to circumferential or tangential directions.

According to an alternative embodiment, three elongated ridges 47, 48 are associated with each of said some heat dissipation and connecting elements 17, two of which 47 extend according to two opposite directions in circumferential direction C-C, and a third elongated ridge 48, which extends in radial direction R-R.

According to an alternative embodiment, three elongated ridges 47,48 are associated with each of said some heat dissipation and connecting elements 17, two of which 47 extend according to two opposite directions in circumferential direction C-C, and a third elongated ridge 48, which extends in a radially outer direction until it is close to an outer peripheral edge of the plates 3,4.

According to an alternative embodiment, each elongated ridge 47, 48 has a convex profile, according to an axial section plane.

The present invention further relates to a disk brake disk 2 comprising a braking band 1 as defined by any one of the embodiments described above and a hub of a vehicle 50 or a bell 33 associated with said braking band 1 and adapted to connect to a wheel hub of a vehicle.

The present invention further relates to a vehicle comprising a disk for a disk brake 2 according to any one of the embodiments described.

LIST OF REFERENCE NUMERALS

1 braking band
2 disk brake disk
3 plate or first plate or outer plate
4 plate or second plate or outer plate
5 first plate or outer plate inner surface
6 second plate or inner plate inner surface
7 gap
8 outer plate surface or first outer plate surface or outer plate outer surface
9 outer plate surface or second outer plate surface or inner plate outer surface
10 first plate or outer plate first braking surface
11 second plate or inner plate second braking surface
12 plate or outer plate
13 plate or inner plate
14 plate or first plate or outer plate thickness
15 plate or second plate or inner plate thickness
16 heat dissipation and T-pillar connecting element
17 heat dissipation and comet pillar connecting element
18 first pillar rank
19 heat dissipation and rhomboidal pillar connecting element
20 first plate or outer plate axial thickness
21 second plate or inner plate axial thickness
23 second pillar rank
24 third pillar rank
25 brake pad
26 attachment portion of the braking band to a hub of a vehicle 50 or a bell
27 attachment portion connection seat for the connection to a hub of a vehicle 50 or a bell
28 radial connection seat height
29 recesses placed between adjoining attachment portions
33 bell
35 outer band edge
36 attachment portion wall
37 side wall portion
38 bottom wall portion
39 inner end wall portion
40 cylindrical bottom arch
41 cylindrical end arch
42 first attachment portion surface or outer attachment portion surface
43 second attachment portion surface or inner attachment portion surface
44 attachment portion axial thickness
45 first connection element end
46 second connection element end
47 circumferential or tangential elongated connection element ridge
48 radial elongated ridge
49 attachment portion bevel
50 vehicle hub
51 threaded portions
52 fixing nuts
A-A braking band or brake disk rotation axis
X-X rotation axis or axial direction
R-R radial direction
C-C circumferential direction
T-T tangential direction
D1 inner braking surface diameter
D2 outer braking surface diameter
H band height
P median plane of the flow of cooling fluid
M braking band center line or axial section plane
L distance between the inner end wall portion 39 and the closed perimeter of the connection seat
I distance between the bottom wall portion and the first plate braking surface

What is claimed is:

1. A braking band of a disk brake disk of the ventilated type, wherein
said braking band extends about a rotation axis (A-A) of the braking band, said rotation axis defining an axial direction (X-X);
said braking band defines a radial direction (R-R), orthogonal to said axial direction (X-X), a circumferential direction (C-C), orthogonal both to said axial direction (X-X) and to said radial direction (R-R), and a tangential direction (T-T), punctually orthogonal to the axial direction (X-X) and the radial direction (R-R);
said braking band comprises a first plate and a second plate mutually arranged facing each other;
said first and second plates comprise, respectively, a first plate inner surface and a second plate inner surface arranged directly or indirectly facing and delimiting a gap;
said first and second plates are joined to each other by heat dissipation and connecting elements;
said heat dissipation and connecting elements project from one of said first and second plates to reach an opposite plate of said first and second plates, forming bridges, connecting the first and second plates to each other;
said first and second plates comprise, respectively, a first plate outer surface and a second plate outer surface, and wherein opposite portions of said first and second outer surfaces form a first plate braking surface and a second plate braking surface, opposite said first braking plate surface, said first and second braking plate surfaces being adapted to cooperate with brake pads to apply a braking action on a vehicle;
said first and second plate braking surfaces extend between an inner diameter (D1), near the rotation axis (A-A) of the braking band, and an outer diameter (D2), far from said rotation axis (A-A) of the braking band, wherein
said braking band further comprises a plurality of attachment portions connecting said braking band directly or indirectly to a vehicle hub or a bell;
each attachment portion of said plurality of attachment portions radially extends towards the rotation axis (A-A) of the braking band;
each attachment portion comprises at least one connection seat directly connecting the braking band to said vehicle hub; said at least one connection seat being arranged at a predefined position in the radial direction (R-R) and having a predefined radial connection seat height;

said plurality of attachment portions are spaced apart by recesses forming free openings in axial direction (X-X) and in radial direction (R-R) towards the rotation axis (A-A) of the braking band;

and wherein each attachment portion comprises an attachment portion wall extending in the axial (X-X) and radial (R-R) directions;

said attachment portion wall comprises opposite side wall portions, each side wall portion facing an adjoining attachment portion; two bottom wall portions in common with adjoining attachment portions, each bottom wall portion facing said rotation axis (A-A) and connecting two adjoining attachment portions; and an inner end wall portion placed at a radially inner end of each attachment portion and connecting the opposite side wall portions;

each attachment portion comprises opposite first and second attachment portion surfaces extending in circumferential direction (C-C) and radial direction (R-R); one of said attachment portion surfaces is oriented externally the braking band, this surface is defined a first attachment portion surface; wherein each recess radially (R-R) extends beyond said at least one connection seat coming close to said inner diameter (D1) of said first and second plate braking surfaces; and wherein each side wall portion is joined to an adjoining bottom wall portion by a cylindrical bottom arch;

each side wall portion is joined to an adjoining inner end wall portion by a cylindrical end arch; and each first attachment portion surface is coplanar to said first plate braking surface.

2. The braking band of claim 1, wherein
said first plate braking surface is an outer braking surface or a braking surface facing a wheel of the vehicle;

and wherein each first attachment portion surface is coplanar to said first plate braking surface in a non-worn or a worn state after running-in; or wherein each first attachment portion surface is substantially coplanar to said first plate braking surface.

3. The braking band of claim 1, wherein
said second attachment portion surface is coplanar to said first plate inner surface delimiting said gap, wherein said first attachment portion surface is joined to said first braking plate surface without channels or grooves;

wherein said second attachment portion surface is joined to said first plate inner surface without channels or grooves.

4. The braking band of claim 1, wherein said plurality of attachment portions are uniformly distributed along the circumferential direction (C-C).

5. The braking band of claim 1, wherein said opposite side wall portions of adjoining attachment portions are mutually facing and parallel.

6. The braking band of claim 1, wherein said plurality of attachment portions form a lobed geometry devoid of edges.

7. The braking band of claim 1, wherein
all attachment portion walls of said plurality of attachment portions comprise cylindrical bottom arches of equal dimensions;
or wherein
all attachment portion walls of said plurality of attachment portions comprise cylindrical end arches of equal dimensions;
or wherein
said cylindrical end arches are of greater dimensions than said cylindrical bottom arches;
or wherein
all attachment portion walls of said plurality of attachment portions comprise cylindrical bottom arches and
all attachment portion walls of said plurality of attachment portions comprise cylindrical end arches.

8. The braking band of claim 1, wherein
each attachment portion of said plurality of attachment portions comprises a predefined attachment portion axial thickness, and
said predefined attachment portion axial thickness is equal to an axial thickness of said first plate;
or wherein
each attachment portion of said plurality of attachment portions comprises a predefined attachment portion axial thickness, and wherein said predefined attachment portion axial thickness is 18 mm.

9. The braking band of claim 1, wherein
said at least one connection seat of each attachment portion is an eyelet with a closed perimeter along a path on a plane containing said radial (R-R) and circumferential (C-C) directions, that is an open hole in an axial direction (X-X).

10. The braking band of claim 1, wherein
a distance between said inner end wall portion and said closed perimeter of said at least one connection seat is greater than a distance between said bottom wall portion and said first plate braking surface.

11. The braking band of claim 1, wherein in a non-worn condition, said first plate comprises a predefined first plate axial thickness, which defines thickness in the axial direction (X-X) of said first plate; and
in a non-worn condition, said second plate comprises a predefined second plate axial thickness, which defines thickness in the axial direction (X-X) of said second plate; and
said first plate axial thickness is greater than said second plate axial thickness.

12. The braking band of claim 1, wherein said first attachment portion surface is joined to said inner end wall portion by an attachment portion bevel inclined by 45 degrees with respect to said axial direction (X-X);
or wherein
said first attachment portion surface is joined to said inner end wall portion by an attachment portion bevel, wherein said attachment portion bevel extends orthogonally to the radial direction (R-R).

13. The braking band of claim 1, wherein
a median plane of flow of cooling fluid (P) crossing said gap is displaced with respect to a center line (M) of the braking band;
the median plane of the flow of cooling fluid (P) crossing the gap is displaced with respect to the center line (M) of the braking band by 0.75 mm; or wherein the median plane of the flow of cooling fluid (P) crossing the gap is displaced along the axial direction (X-X) towards said second plate with respect to the center line (M) of the braking band.

14. The braking band of claim 1, wherein
each heat dissipation and connecting element has two respective ends at which the heat dissipation and connecting element is joined to the first and second plates;

some of said heat dissipation and connecting elements are associated with elongated ridges extending from at least one of said two respective ends in at least one given direction;

the elongated ridges are integrally formed with said some heat dissipation and connecting elements and at least one plate of said first and second plates; and the elongated ridges are raised from at least one inner surface between said first and second inner surfaces of the first and second plates, and emerge from at least one of the first and second plate inner surfaces by a height inferior to an axial distance between the first and second plate inner surfaces or to gap height.

15. The braking band of claim 14, wherein
said elongated ridges comprise elongated connection elements extending according to the circumferential or tangential directions;

or wherein three elongated ridges are associated with each of said some heat dissipation and connecting elements, wherein two of the three elongated ridges extend according to two opposite directions in the circumferential direction (C-C), and a third elongated ridge of the three elongated ridges extends, in the radial direction (R-R);

or wherein three elongated ridges are associated with each of said some heat dissipation and connecting elements, wherein two of the three elongated ridges extend according to two opposite directions in the circumferential direction (C-C), and a third elongated ridge of the three elongated ridges extends in the radial direction until it is close to an outer peripheral edge of the first and second plates.

16. The braking band of claim 14, wherein each elongated ridge has a convex.

17. A disk brake disk comprising a braking band wherein
said braking band extends about a rotation axis (A-A) of the braking band, said rotation axis defining an axial direction (X-X);

said braking band defines a radial direction (R-R), orthogonal to said axial direction (X-X), a circumferential direction (C-C), orthogonal both to said axial direction (X-X) and to said radial direction (R-R), and a tangential direction (T-T), punctually orthogonal to the axial direction (X-X) and the radial direction (R-R);

said braking band comprises a first plate and a second plate mutually arranged facing each other;

said first and second plates comprise, respectively, a first plate inner surface and a second plate inner surface arranged directly or indirectly facing and delimiting a gap;

said first and second plates are joined to each other by heat dissipation and connecting elements;

said heat dissipation and connecting elements project from one of said first and second plates to reach an opposite plate of said first and second plates, forming bridges, connecting the first and second plates to each other;

said first and second plates comprise, respectively, a first plate outer surface and a second plate outer surface, and wherein opposite portions of said first and second outer surfaces form a first plate braking surface and a second plate braking surface, opposite said first braking plate surface, said first and second braking plate surfaces being adapted to cooperate with brake pads to apply a braking action on a vehicle;

said first and second plate braking surfaces extend between an inner diameter (D1), near the rotation axis (A-A) of the braking band, and an outer diameter (D2), far from said rotation axis (A-A) of the braking band, wherein said braking band further comprises a plurality of attachment portions connecting said braking band directly or indirectly to a vehicle hub or a bell;

each attachment portion of said plurality of attachment portions radially extends towards the rotation axis (A-A) of the braking band;

each attachment portion comprises at least one connection seat directly connecting the braking band to said vehicle hub; said at least one connection seat being arranged at a predefined position in the radial direction (R-R) and having a predefined radial connection seat height;

said plurality of attachment portions are spaced apart by recesses forming free openings in axial direction (X-X) and in radial direction (R-R) towards the rotation axis (A-A) of the braking band;

and wherein each attachment portion comprises an attachment portion wall extending in the axial (X-X) and radial (R-R) directions;

said attachment portion wall comprises opposite side wall portions, each side wall portion facing an adjoining attachment portion; two bottom wall portions in common with adjoining attachment portions, each bottom wall portion facing said rotation axis (A-A) and connecting two adjoining attachment portions; and an inner end wall portion placed at a radially inner end of each attachment portion and connecting the opposite side wall portions;

each attachment portion comprises opposite first and second attachment portion surfaces extending in circumferential direction (C-C) and radial direction (R-R); one of said attachment portion surfaces faces externally said braking band, said surface is defined as a first attachment portion surface;

wherein each recess radially (R-R) extends beyond said at least one connection seat coming close to said inner diameter (D1) of said first and second plate braking surfaces;

and wherein each side wall portion is joined to an adjoining bottom wall portion by a cylindrical bottom arch;

each side wall portion is joined to an adjoining inner end wall portion by a cylindrical end arch;

each first attachment portion surface is coplanar to said first plate braking surface;

and a vehicle hub or a bell associated with said braking band and adapted for connection to a hub of a vehicle wheel.

18. A vehicle comprising a disk for a disk brake, said disk brake disk comprising a braking band wherein
said braking band extends about a rotation axis (A-A) of the braking band, said rotation axis defining an axial direction (X-X);

said braking band defines a radial direction (R-R), orthogonal to said axial direction (X-X), a circumferential direction (C-C), orthogonal both to said axial direction (X-X) and to said radial direction (R-R), and a tangential direction (T-T), punctually orthogonal to the axial direction (X-X) and the radial direction (R-R);

said braking band comprises a first plate and a second plate mutually arranged facing each other;

said first and second plates comprise, respectively, a first plate inner surface and a second plate inner surface arranged directly or indirectly facing and delimiting a gap;

said first and second plates are joined to each other by heat dissipation and connecting elements;

said heat dissipation and connecting elements project from one of said first and second plates to reach an opposite plate of said first and second plates, forming bridges, connecting the first and second plates to each other;

said first and second plates comprise, respectively, a first plate outer surface and a second plate outer surface, and wherein opposite portions of said first and second outer surfaces form a first plate braking surface and a second plate braking surface, opposite said first braking plate surface, said first and second braking plate surfaces being adapted to cooperate with brake pads to apply a braking action on a vehicle;

said first and second plate braking surfaces extend between an inner diameter (D1), near the rotation axis (A-A) of the braking band, and an outer diameter (D2), far from said rotation axis (A-A) of the braking band, wherein said braking band further comprises a plurality of attachment portions connecting said braking band directly or indirectly to a vehicle hub or a bell;

each attachment portion of said plurality of attachment portions radially extends towards the rotation axis (A-A) of the braking band;

each attachment portion comprises at least one connection seat directly connecting the braking band to said vehicle hub; said at least one connection seat being arranged at a predefined position in the radial direction (R-R) and having a predefined radial connection seat height;

said plurality of attachment portions are spaced apart by recesses forming free openings in axial direction (X-X) and in radial direction (R-R) towards the rotation axis (A-A) of the braking band;

and wherein each attachment portion comprises an attachment portion wall extending in the axial (X-X) and radial (R-R) directions;

said attachment portion wall comprises opposite side wall portions, each side wall portion facing an adjoining attachment portion; two bottom wall portions in common with adjoining attachment portions, each bottom wall portion facing said rotation axis (A-A) and connecting two adjoining attachment portions; and an inner end wall portion placed at a radially inner end of each attachment portion and connecting the opposite side wall portions;

each attachment portion comprises opposite first and second attachment portion surfaces extending in circumferential direction (C-C) and radial direction (R-R); one of said attachment portion surfaces faces externally said braking band, said surface is defined as a first attachment portion surface;

wherein each recess radially (R-R) extends beyond said at least one connection seat coming close to said inner diameter (D1) of said first and second plate braking surfaces;

and wherein each side wall portion is joined to an adjoining bottom wall portion by a cylindrical bottom arch;

each side wall portion is joined to an adjoining inner end wall portion by a cylindrical end arch; and each first attachment portion surface is coplanar to said first plate braking surface;

and a vehicle hub or a bell associated with said braking band and adapted for connection to a hub of a vehicle wheel.

* * * * *